US006563856B1

(12) United States Patent
O'Shea et al.

(10) Patent No.: US 6,563,856 B1
(45) Date of Patent: May 13, 2003

(54) FRAME SYNCHRONIZATION AND DETECTION TECHNIQUE FOR A DIGITAL RECEIVER

(75) Inventors: Deirdre O'Shea, San Diego, CA (US); Ismail Lakkis, San Diego, CA (US); Saeid Safavi, San Diego, CA (US); Masood K. Tayebi, San Diego, CA (US); Baya Hatim, San Diego, CA (US); Cathal O'Scolai, San Diego, CA (US)

(73) Assignee: Wireless Facilities, Inc., San Diego, CA (US)

( * ) Notice: Subject to any disclaimer, the term of this patent is extended or adjusted under 35 U.S.C. 154(b) by 0 days.

(21) Appl. No.: 09/111,812

(22) Filed: Jul. 8, 1998

(51) Int. Cl.[7] .................................................. H04B 1/69
(52) U.S. Cl. ...................................................... 375/130
(58) Field of Search ................................ 375/131, 146, 375/130, 343; 370/335

(56) References Cited

U.S. PATENT DOCUMENTS

| | | | | |
|---|---|---|---|---|
| 3,922,496 A | * 11/1975 | Gabbard et al. | 370/324 |
| 3,997,772 A | 12/1976 | Crochiere et al. | 235/152 |
| 4,471,480 A | 9/1984 | Haussmann et al. | |
| 5,500,899 A | * 3/1996 | Snow | 380/47 |
| 5,555,247 A | 9/1996 | Matsuoka et al. | |
| 5,590,160 A | 12/1996 | Ostman | 375/367 |
| 5,627,863 A | 5/1997 | Aslanis et al. | 375/357 |
| 5,737,324 A | * 4/1998 | Dixon et al. | 370/342 |
| 6,078,576 A | * 6/2000 | Schilling et al. | 370/347 |

FOREIGN PATENT DOCUMENTS

GB 2 213 025 A 8/1989
GB 2 286 949 A 8/1995

OTHER PUBLICATIONS

Proakis, J.G., Digital Communications, McGraw–Hill Publishers, Third Edition, pp. 744–752, 1995 "Synchronization of Spread Spectrum Systems".

Meyr, H., Moeneclaey M. and Fechtel S.A., Digital Communication Receivers: Synchronization, Channel Estimation and Signal Processing, John Wiley Publishers, pp. 283–295, 1998 "Synthesis of Synchronization Algorithms".

Meyr, H., Moeneclaey M. and Fechtel S.A., Digital Communication Receivers: Synchronization, Channel Estimation and Signal Processing, John Wiley Publishers, pp. 486–488, 1998 "Frequency Estimation".

Meyr, H., Moeneclaey M. and Fechtel S.A., Digital Communication Receivers: Synchronization, Channel Estimation and Signal Processing, John Wiley Publishers, pp. 542–545, 1998 "DSP System Implementation".

* cited by examiner

*Primary Examiner*—Chi Pham
*Assistant Examiner*—Kevin M Burd
(74) *Attorney, Agent, or Firm*—Knobbe, Martens, Olson & Bear, LLP

(57) ABSTRACT

A combiner circuit and method for use in a digital transmitter within a communication system. The combiner circuit receives a number of signal streams that include data frames. Each frame includes an arbitrary data sequence and portions of a unique word. The combiner circuit comprises a plurality of digital preamble circuits which append a predetermined number of contiguous bits from the unique word to each data frame. The system utilizes a plurality of spreaders, shifters, and a summer to further modify the data stream for transmission.

20 Claims, 12 Drawing Sheets

FRAME SYNCHRONIZATION AND DETECTION TECHNIQUE FOR A DIGITAL RECEIVER

BACKGROUND OF THE INVENTION

1. Field of the Invention

The invention relates to communication systems, and more particularly to an apparatus for achieving frame synchronization in a digital receiver.

2. Related Technology

In radio transmission, information is conveyed by uniformly spaced pulses and the function of any receiver is to isolate these pulses as accurately as possible. However, due to the transmission channel, the received signal has undergone alterations during transmission, and a complete estimation of certain reference parameters is necessary prior to data detection. These unknown parameters can cover such factors as the optimum sampling location, the start of a data packet (for burst mode transmission) or of a frame marker for continuous transmission, or the phase offset introduced in the channel or induced by instabilities between the transmitter and receiver oscillators. The extraction of the phase or frequency of the incoming carrier is known as phase/frequency estimation. Alternatively, non-coherent demodulation such as differential demodulation can be applied where the phase difference between one data symbol and the next is assumed constant.

In traditional analog receivers, synchronization of the phase and frequency is typically performed in the intermediate frequency (IF) stage of the receiver. However, the IF analog components are costly and prone to undesirable variations over time. Flexibility in the design of the receiver synchronization unit has increased in recent times with the advent of increasingly powerful silicon chips, which are considerably cheaper and more stable. This has led to a reduction in the amount of signal processing being performed at IF. In the current state of the technology, IF sections are reduced to an asynchronous sampling device for analog to digital conversion and a free-running oscillator for down conversion to baseband. The term "baseband" refers to when the carrier frequency has been completely removed from the received signal and the signal is centered at DC (0 Hz). In typical digital receivers, the asynchronous sampling device operates at a rate of two or more samples per symbol. The term "symbol" is used in this context to refer to transmitted signals that are phase modulated with discrete phase and or amplitude relationships. Each assigned phase and or amplitude relationship is a symbol that is subject to detection at the receiver.

In communication systems, information is transmitted either continuously or in bursts. In both cases, the data from the information source at the transmitter is sub-divided into units known as frames. The purpose of data frames in continuous transmission is to provide a marker to track the received data at the end-user destination as well as to organize the data stream into uniformly sized groups of bits. Even more importantly, frame synchronization is essential in any system utilizing block error control coding (H. Meyr, M. Moeneclaey and S. Fechtel, "Digital Communication Receivers: Synchronization, Channel Estimation and Signal Processing", John Wiley Publishers, 1998, pp. 542–545) wherein codewords are identified with respect to the frame synchronization reference. Moreover, frame synchronization is very important in continuous transmission when frames can be lost due to adverse channel conditions if the receiver cannot track and remove the condition quickly enough. When the receiver settles again, there should be some mechanism to indicate to the receiver when the detected data is meaningful. This function is performed by the periodic insertion of frame markers and midambles in packet transmission to indicate the start of valid data and to assist in updating the parameter acquisition and tracking mechanism. In burst mode transmission, the data bursts are received starting at a random location within a predefined time slot. The purpose of frame synchronization in this case, as well as before for continuous data, is to estimate the location of the start of the data as well as assisting in the estimation of the unknown parameters for the receiver detection.

The most common technique used in frame synchronization is the insertion of fixed data patterns at the transmitter, known as frame markers, at the start of the data frame to assist synchronization. The purpose of frame synchronization is to isolate the position of the start of the arbitrary data stream, which follows these frame markers, as illustrated in FIG. 1. A compromise is necessary between the length of the frame marker to ensure minimal loss of synchronization and the length of the associated information bits in the frame to achieve an efficient data throughput. Data throughput refers to the amount of information bits sent in a frame with respect to the total number of bits sent in the frame.

To achieve frame synchronization at the receiver using the frame marker method, the receiver searches the entire data stream for a sequence matching the known frame marker inserted at the transmitter. From a signal theory perspective, the receiver performs a cross correlation of the frame marker with the received signal. If the receiver is not in synchronization with the framing pattern, the accumulated correlation will be low. When the receiver comes into frame synchronization, however, the correlation should be nearly perfect, blemished only by an occasional detection error. Synchronization is achieved by implementing a filter with the values of the coefficients at the filter taps matched to the frame marker sequence inserted at the transmitter. Depending on the sampling rate N, the filter taps are spaced N delays apart to isolate the correct sample at which the frame marker sequence ends (the value of N is the same). Matching the coefficients at the transmitter and receiver ensures that the correlation energy is maximized at the filter output when the two sequences coincide. The frame marker sequence in the literature is also referred to as a unique word or synchronization sequence; hereafter the frame marker sequence is referred to as the unique word due to its special correlation properties.

The unique word sequence is chosen for its near-optimum correlation properties, a Dirac (or impulse) auto correlation characteristic is ideal for frame synchronization. However, in practice, the auto-correlation characteristic of a unique word sequence contains a strong peak where the two sequences coincide as well as sidelobes at fixed intervals on both sides of the main peak as illustrated in FIG. 2. FIG. 2 shows the situation where the input signal is sampled at one sample per symbol, which implies there is only one sample on the main lobe of the correlation. A good unique word has the property that the absolute value of its correlation sidelobes is small with respect to the absolute value of the main correlation lobe. A correlation sidelobe is the value of the correlation of the unique word with a time-shifted version of itself.

The next stage in any receiver is the detection of the correlation peak. In the case of complex modulation schemes where data is transmitted on both an In-phase (I)

branch and a Quadrature (Q) branch, the unique word is simultaneously transmitted on both branches. For complex modulation schemes where the unique word is repeated on both the I and Q branches, a complex matched filter is unnecessary. Instead two real matched filters outputs for both the in-phase and quadrature components are combined to yield the equivalent complex matched filter output. This avoids unnecessary complexity in the receiver implementation. Therefore, to obtain the overall autocorrelation function, the magnitude or magnitude squared of the I and Q correlation outputs is taken. The magnitude of the correlation eliminates the effect of any phase offset present on the received signal at the input to the correlators. This technique gives reliable results for the case where the phase offset is of the order of $10^{-3}$ of the inverse of the midamble (or unique word if no midamble is used) duration. The next step is to pass the absolute value of the correlation through a threshold detector. The threshold detector is set to a sufficiently high value such that only the main lobe of the correlation passes the threshold.

Typically in the technology, frame synchronization occurs after the receiver has compensated for the phase, frequency and timing offsets on the received signal. In this situation, the input signal contains no phase jitter and therefore, a short unique word is sufficient to obtain reliable frame synchronization. However, in the current technology there is a trend to avoid the transmission of known data streams with limited functionality (H. Meyr, M. Moeneclaey and S. A. Fechtel, "Digital Communication Receivers: Synchronization, Channel Estimation and Signal Processing", John Wiley Publishers, 1997, pp. 486–488) so the unique word sequences assist in other aspects of the receiver, such as phase and timing estimation. This implies that frame synchronization in these systems occurs before timing and phase estimation (O'Shea et. al., "Joint Maximum Likelihood Frame and Timing Estimation for a Digital Receiver", U.S. patent application Ser. No. 09/093,414, filed Jun. 8, 1998).

However, performing frame synchronization prior to phase and timing estimation involves careful design of the frame synchronization unit. In these conditions, the input signal to the frame correlation unit is sampled at a rate of at least two samples per symbol since timing estimation, in general, requires at least two samples per symbol (H. Meyr, M. Moeneclaey and S. A. Fechtel, "Digital Communication Receivers: Synchronization, Channel Estimation and Signal Processing", John Wiley Publishers, 1997, pp. 283–295). As an example, if the rate is two samples per symbol, the main lobe is sampled at two samples per symbol as illustrated in FIG. 3. Comparing the main lobe of FIG. 3 to that of the main lobe in FIG. 2, only one sample of the main lobe is available in FIG. 2, whereas two samples are available in FIG. 3. Due to asynchronous sampling, the sampled absolute value (or magnitude squared value) of the correlation output differs depending on the instant where sampling occurs as illustrated in FIG. 4, which also shows that for two samples per symbol, two values can cross a conservative setting for a threshold.

When frame synchronization occurs prior to phase estimation, the presence of a phase offset has a significant impact on the setting of the threshold as the correlation peak value varies depending on channel conditions. This results in conservative values being set for the threshold detector level, which can lead to two values crossing the threshold as illustrated in FIG. 4. The issue is then to isolate the true location of the start of the arbitrary data. What is needed is a circuit that improves the flexibility of the threshold circuit by isolating the correct location of the beginning of the arbitrary data when more than one sample crosses the threshold detector. Such a circuit would improve the threshold design by using information about the threshold input (i.e., whether the signal has a rising slope) to improve reliability in the presence of phase and frequency offsets.

In the current technology, frame synchronization is discussed either in terms of CDMA (Code Division Multiple Access) or TDMA (Time Division Multiple Access) schemes. Frame synchronization and detection techniques for alternative transmission multiple access schemes, which transmit all users simultaneously, have not been discussed. As an example, schemes that combine aspects of both CDMA and TDMA, such as a joint TDMA/CDMA scheme, have not been addressed. The term "multiple access schemes" defines the various ways in which multiple users can access a common channel to transmit data. In one joint TDMA/CDMA scheme (Masood K. Tayebi, "Wireless Multimedia Carrier System", U.S. patent application Ser. No. 08/954,217, filed Oct. 20, 1997), rather than assigning a unique spreading code to each user, all users are assigned a common spreading code equal to the length of the number of users. However, each user is assigned a unique time offset equal to the duration of one chip with respect to the start of the previous user's data stream as illustrated in FIG. 5. The term "chip" refers to one bit of the pseudo-noise spreading code so as to differentiate it from the source data bits. The data streams are then summed together to form the transmitted signal. At the receiver, following a pulse shaping filter, the spreading code is removed using a matched filter, such as a spreading code matched filter, or any of a variety of techniques available in the literature (J.G. Proakis, "Digital Communications", McGraw-Hill Publishers, Third Edition, 1995, pp. 744–752). However, any alternative technique can be used with equal success. Due to the shifts at the transmitter of the users by one spreading chip interval, the users' original data bits, if following the spreading code matched filter, are now transformed to a data sequence at the spreading code rate where each user in turn contributes one data chip. The data sequence corresponds to the ordering of the users, i.e., the first chip is from user one, the second from user two and so on. As the number of users equals the length of the spreading code, the first three chips of the data sequence are of duration equal to one data bit. A sidelobe suppression filter is used to suppress undesirable sidelobes following the spreading code matched filter.

What is desired is a method for frame synchronization suitable for a joint TDMA/CDMA scheme or similar multiple access schemes that provide simultaneous frame synchronization of multiple users with minimum overhead bandwidth. Instead of a separate unique word for each user, which is wasteful of bandwidth, it would be desired to distribute the unique word bits over all the users. In this situation the unique word would be chosen as some integer multiple of the number of users. For example, in a TDMA/CDMA system with 32 users, at the start of each user's stream there would be two bits pre-assigned for the unique word. This would avoid the transmission of a 64 bit unique word on each user's data stream. The output of the spreading code matched filter at the start of the data frame would be a 64 chip unique word. Each bit of the unique word would appear contiguously in slots of duration equal to the spreading code chip length. Such a proposed scheme would also be adopted for more traditional multiple access schemes. What is also desired is a robust method of threshold detection for situations when the input signal to the frame synchronization unit would be oversampled at a rate higher than one sample per symbol and may contain a frequency and/or phase offset.

SUMMARY OF THE INVENTION

One aspect of the invention includes a system and method of frame synchronization and detection for use in a digital receiver within a communication system. A digital radio communication system includes a receiver for receiving a signal stream that includes data frames. In one embodiment, each frame includes an arbitrary data sequence and a unique word. The communication system comprises a sampling circuit for sampling symbol levels, a filter to implement the cross correlation of the received signal with the stored unique word, a threshold detector circuit to detect when frame synchronization is achieved as well as additional circuitry to refine the estimate from the threshold detection circuit. In one embodiment, coherent demodulation is utilized; however, the design is equally applicable to non-coherent demodulation. In one embodiment, the sampling rate is assumed to be two samples per symbol. However, the functionality of the proposed design is not limited to two samples per Asymbol.

The system and method are provided for a variety of digital receivers employing a multiple access scheme, wherein multiple user streams are transmitted simultaneously and can also be used for more traditional systems. In one embodiment, the method is discussed with respect to a joint TDMA/CDMA scheme. The method involves splitting the unique word among all the user streams at the transmitter. Each bit of the unique word is assigned to a user, as opposed to transmitting the entire unique word for each user, which is wasteful of bandwidth. If the length of the unique word exceeds the number of users, an integral number of bits of the unique word is assigned to each user (O'Shea et. al., "Joint Maximum Likelihood Frame and Timing Estimation for a Digital Receiver", U.S. patent application Ser. No. 09/093,414, filed Jun. 8, 1998).

In another aspect of the invention, a digital receiver system comprises a filtering block 820, a frame synchronization subsystem 900 and other synchronization and functional blocks 830. The filtering block 820 comprises a pulse-shaping filter, a spreading code-matched filter and a sidelobe suppression filter. The frame synchronization system 900 comprises two real-valued synchronization sequence matched filters 915 and 920, followed by a combination circuit 925 to form the I and Q filter outputs. The magnitude of the real 935 and imaginary 930 filter components is then formed to reduce the effect of noise and the presence of any phase offset. A threshold detection circuit 950 is then applied to detect the maximum of the magnitude of the frame correlation output 940. The output of the frame synchronization unit is then fed into additional synchronization subsystems 830 to assist in the synchronization of the remainder of the receiver.

The input to the filtering block has previously been sampled at the analog to digital converter (ADC) with a fixed clock (e.g., at a sampling clock frequency of 46.7 MHz). Note that the signals received by the filtering block might not be sampled, and that the sampling may take place only after an analog pulse-shaping filter within the filtering block.

Another aspect of the invention includes, for use in a digital transmitter, a combiner circuit having a unique word and receiving a predetermined number of data streams, wherein each data stream comprises a plurality of data frames, the combiner circuit comprising a plurality of digital preamble circuits, each preamble circuit associated with one of the data streams and being capable of appending a predetermined number of contiguous bits from the unique word to the beginning of each data frame to generate an extended data frame; a plurality of spreaders, each spreader associated with one of the data streams and being capable of spreading each extended data frame, wherein each spreader receives a spreading code comprising a plurality of chips; a plurality of shifters, each shifter associated with one of the data streams and being capable of shifting the spread extended data frame by a delay equivalent to a multiple of the length of one chip of the spreading code; and a summer receivably connected to the shifters and being capable of summing the plurality of shifted data streams.

Yet another aspect of the invention includes a frame synchronization circuit receiving a sampled in-phase (I) signal component and a sampled quadrature (Q) signal component, wherein a unique word is included in both signals, the circuit for use in a digital receiver, comprising a correlation circuit capable of correlating a prestored unique word and the unique word included in the I and Q signal components; an I magnitude circuit and a Q magnitude circuit receiving the I and Q outputs of the correlation circuit and capable of determining the magnitude of the correlation; a summer capable of summing the outputs of the I magnitude circuit and the Q magnitude circuit; and a threshold detection circuit capable of identifying a pulse representative of a frame synchronization peak.

BRIEF DESCRIPTION OF THE DRAWINGS

The above and other aspects, features and advantages of the invention will be better understood by referring to the following detailed description of the preferred embodiment, which should be read in conjunction with the accompanying drawings, in which:

FIG. 6, which comprises FIG. 6*a* is a diagram showing a unique word for three users at the output of the sidelobe suppression filter shown in FIG. 5*b*, and FIG. 6*b* is a diagram showing a unique word of length six bits.

DETAILED DESCRIPTION OF THE PREFERRED EMBODIMENT

The following detailed description of the preferred embodiments presents a description of certain specific embodiments of the present invention. However, the present invention can be embodied in a multitude of different ways as defined and covered by the claims. In this description, reference is made to the drawings wherein like parts are designated with like numerals throughout.

FIGS. 1–6 show framing techniques. FIGS. 7–11 show the implementation of the present invention.

Figure 1:
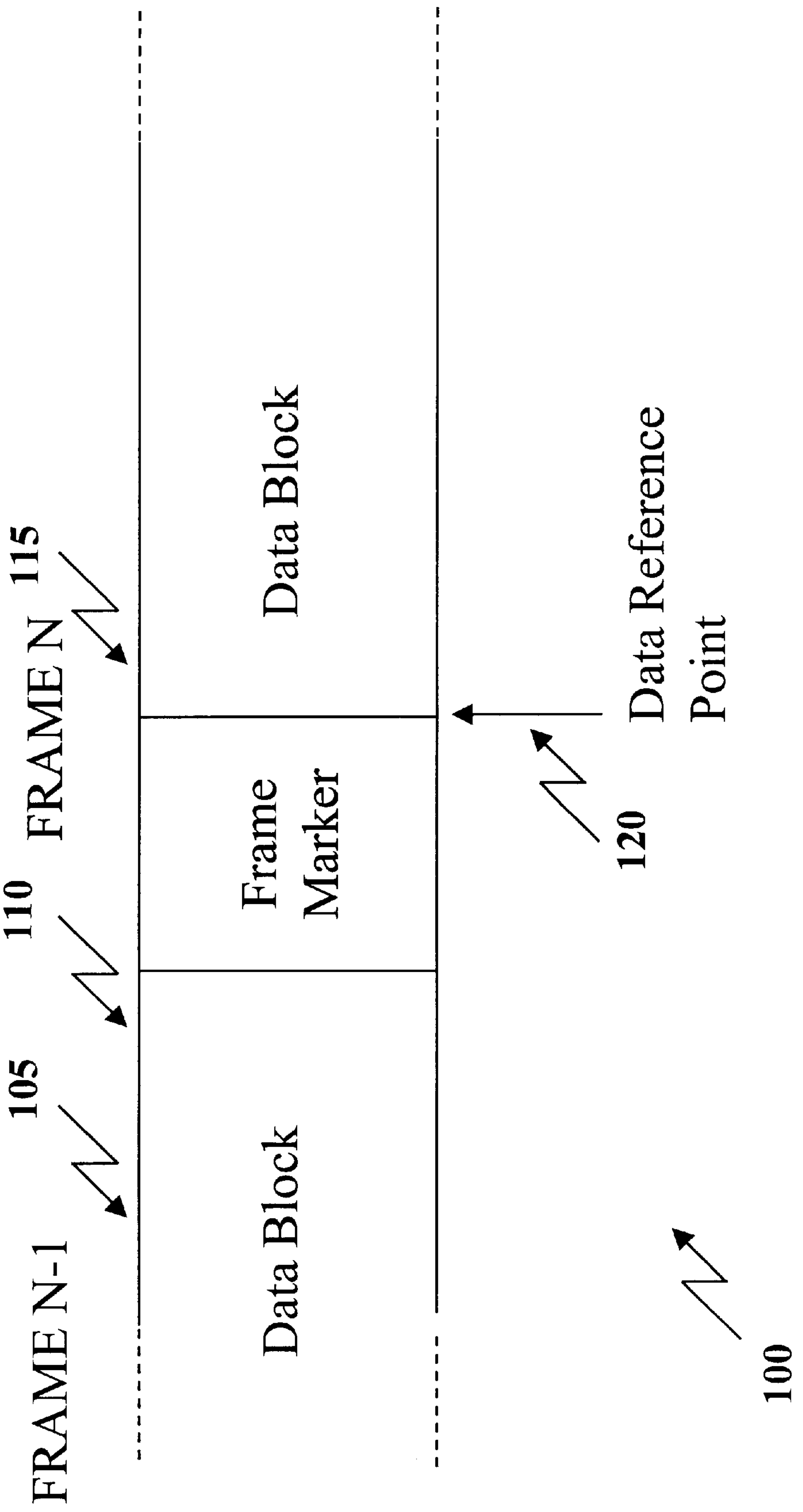
FIG. 1 is a diagram illustrating the concept of frame synchronization with the unique word (frame marker) for a continuous data stream.
Figure 2A:
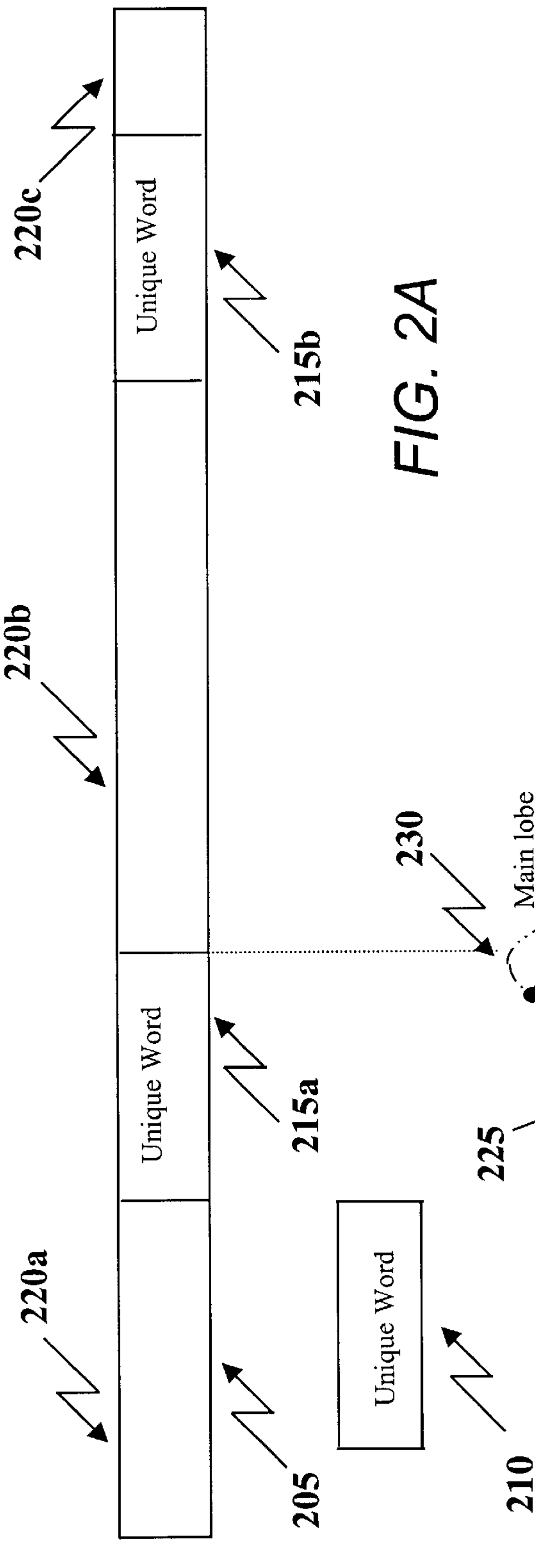
FIG. 2*a* is a diagram of the received signal frame structure.
Figure 2B:
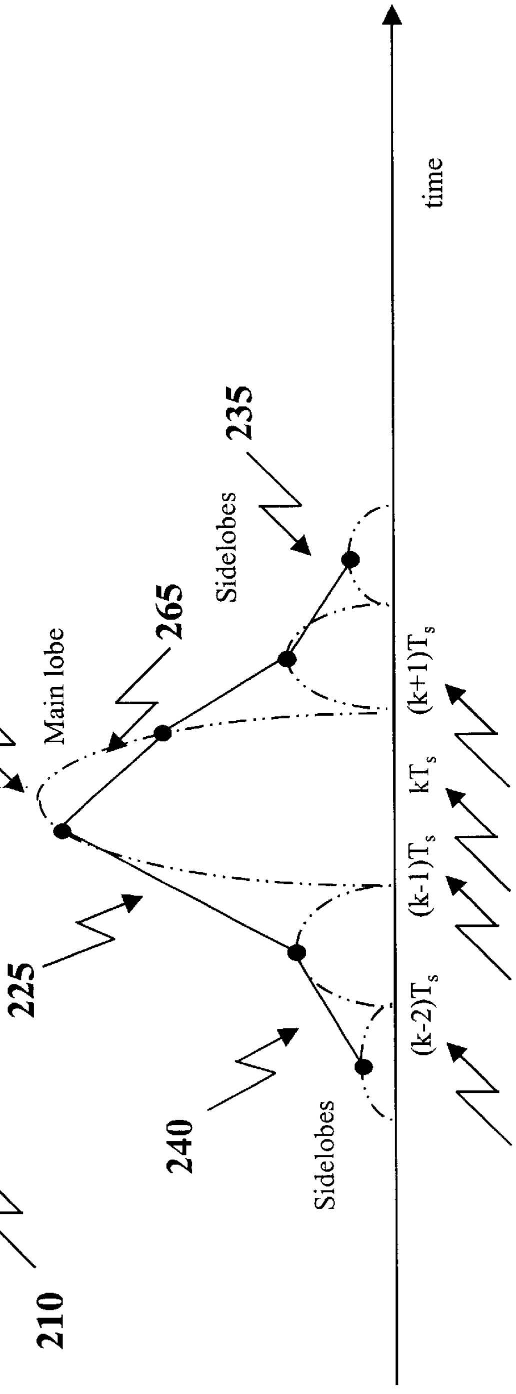
FIG. 2*b* is a diagram illustrating the correlation output of the unique word with a continuous received signal stream at one sample per symbol.
Figure 9:
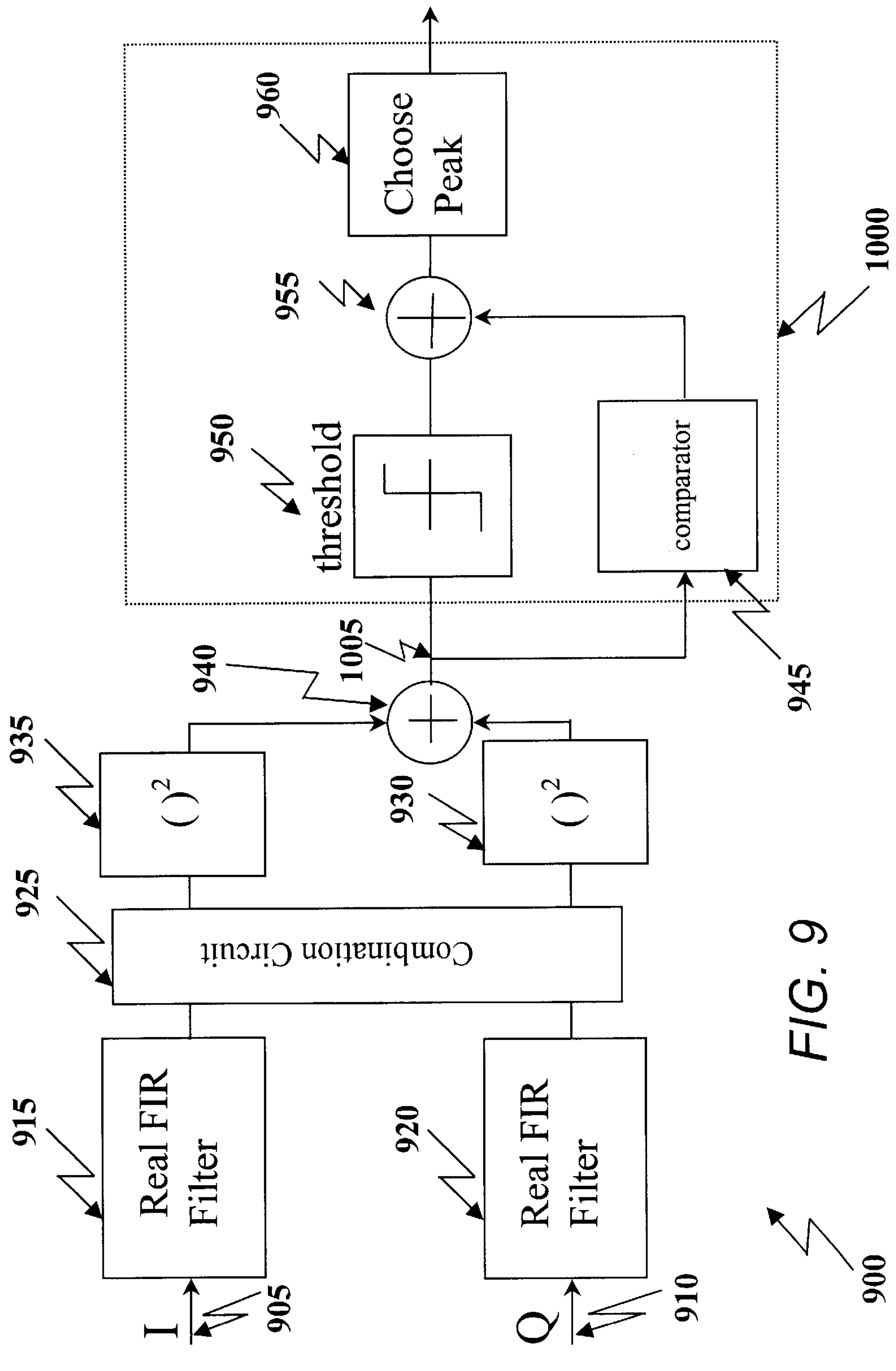
FIG. 9 is a block diagram of the frame synchronization and detection circuitry shown in FIG. 8.

Referring to FIG. 1, the concept of frame synchronization 100 with a frame marker or unique word 110 for a continuous data stream will be described. The portion of the continuous data stream shown in FIG. 1 is split into two data frames 105 and 115. The unique word 110 separates the two frames N–1 and N. The location of a frame synchronization maximum 120 corresponds to the last bit of the unique word 110. The frame synchronization reference is used in a receiver to assist in such tasks as word synchronization, which is critical for data decoding. Referring now to FIG. 2*a*, a structure of signal stream 205 will be described. Time continuous data 205 is interspersed with unique words 215*a* and 215*b* to maintain synchronization of the data frames at 220*a*, 220*b* and 220*c*. FIG. 2*a* illustrates the traditional case where frame synchronization occurs following data detection, and the input signal is sampled at one sample per symbol. For illustration purposes only, the length of the unique word 215*a* and 215*b* is disproportionately large compared to the length of the data bursts. A copy of the unique word sequence 210 is stored in the receiver, which continuously performs a sliding correlation between the received signal and the stored copy of the unique word sequence 210. This is further illustrated in FIG. 9 in a pair of finite-impulse-response (FIR) filter blocks 915 and 920. The sliding correlation results in the spectrum 225 illustrated in FIG. 2*b* with a main lobe corresponding to the instant of frame synchronization at main lobe peak 230 and secondary sidelobes 240 and 235. A continuous time correlation output 265 corresponds to the ideal frame correlation output 230 as illustrated in FIG. 2*b*. Referring briefly to FIG. 9, when both sequences are perfectly aligned, a peak similar to peak 230 is formed at the output of the adder 940 of the two magnitude blocks 935 and 930, which follow the frame synchronization filters 915 and 920. Smaller peaks (i.e., sidelobes) continuously appear as the unique word is correlated with the received signal. The magnitude (or magnitude squared, as either can be used) of the correlation output is proportional to the degree of similarity between the unique word and that segment of the received signal.

Figures 3A, 3B:
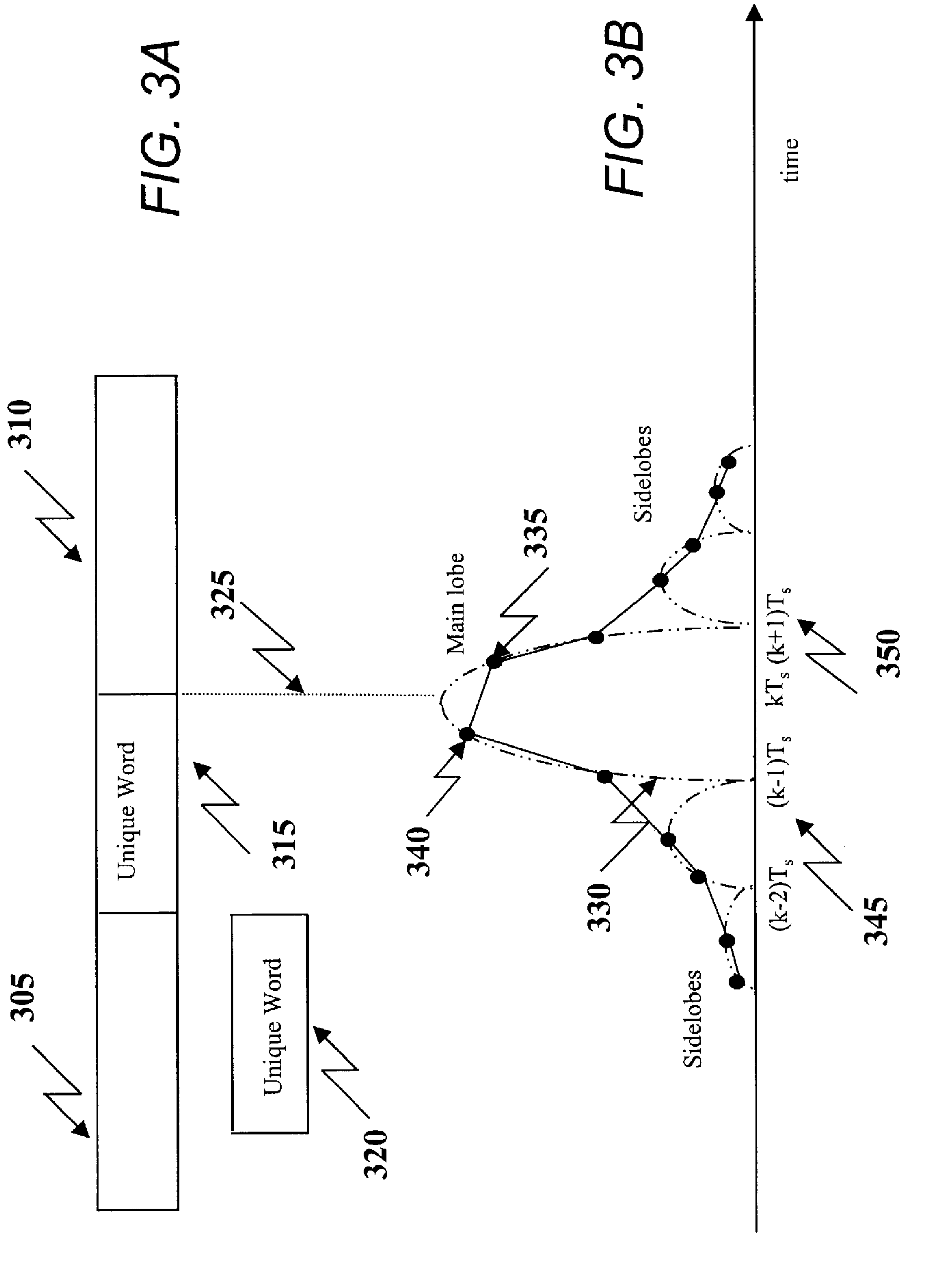
FIG. 3*a* is a diagram of a portion of the received signal frame structure.
FIG. 3*b* is a diagram illustrating the correlation output of the unique word with a continuous received signal stream at two samples per symbol.

Referring now to FIGS. 3*a* and 3*b*, the correlation output when the continuous input signal to the frame synchronization unit 900 is over-sampled at two samples (shown in FIG. 3*b* at sample locations 340 and 335) per symbol will be described. A portion of the input signal (as previously shown in FIG. 2*a*) contains two frames with arbitrary data 305 and 310 with a unique word 315. A local copy of the unique word 320 is not over-sampled as this would result in a different sequence. Instead the local copy of the unique word in the receiver is interpolated with zeros to ensure that the data rates of the local copy of the unique word 320 and the signal segment of the received data stream are at the same data rate. However, the interpolation of zeros does not affect the properties of the unique word sequence. This approach of the input signal being over-sampled at a rate greater than one sample per symbol prior to frame synchronization applies to non-traditional approaches where frame synchronization occurs prior to phase and timing estimation (O'Shea et. al., "Joint Maximum Likelihood Frame and Timing Estimation for a Digital Receiver", U.S. patent application Ser. No. 09/093,414, filed Jun. 8, 1998). Note that with over-sampling of the input signal, a more accurate estimate of the true location of the frame synchronization maximum is possible. In FIG. 3*b*, the continuous time representation of the frame synchronization maximum is also illustrated at main lobe 330. Clearly, with more samples of the main lobe 330, a more refined estimate of the start of the arbitrary data stream is possible. However, this involves additional decision logic as is outlined in FIGS. 9 and 10.

Figures 4A, 4B, 4C:
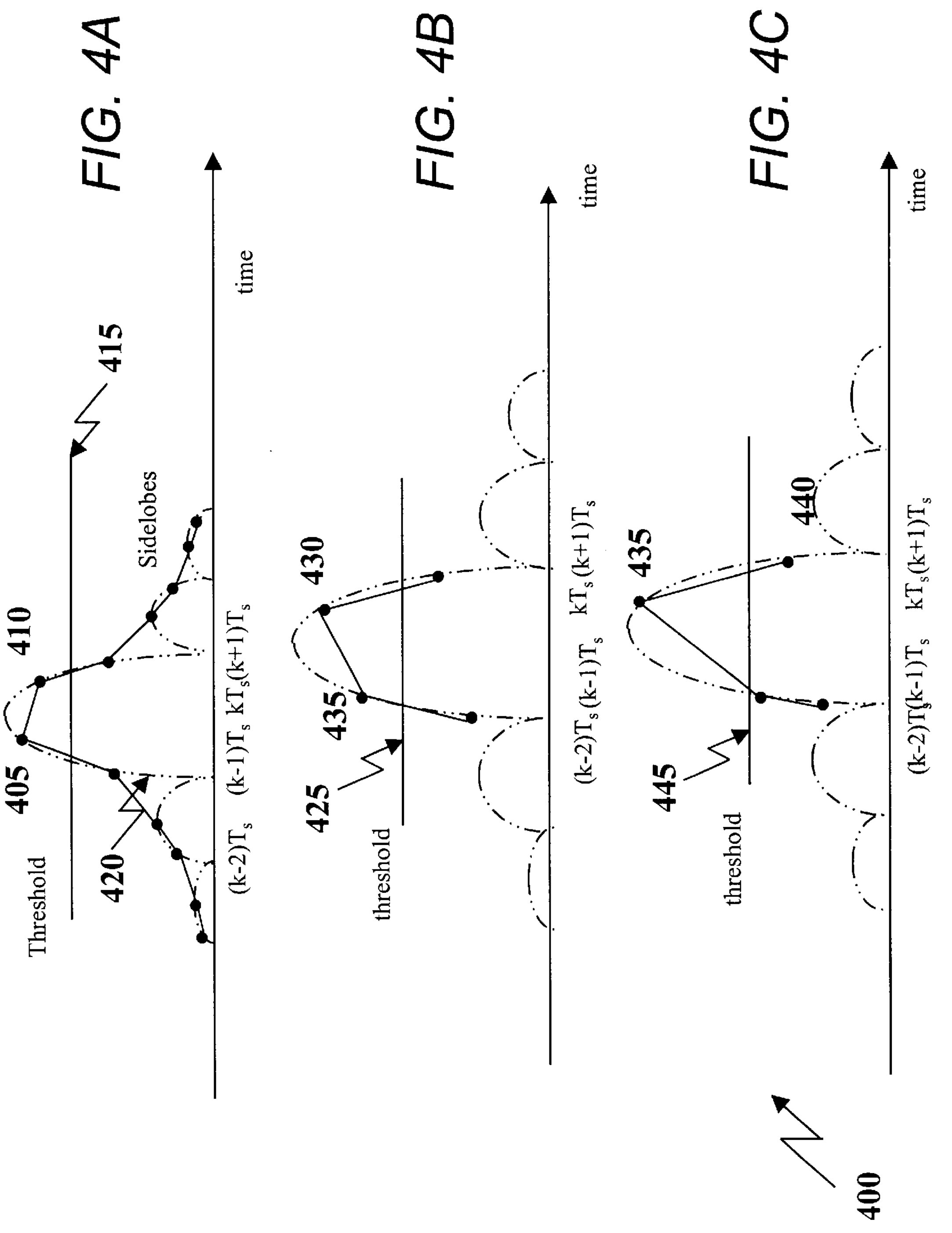
FIG. 4*a*, FIG. 4*b* and FIG. 4*c* are diagrams illustrating three different possibilities for the location of the sampled frame maximum with respect to the continuous time correlation spectrum.

Referring to FIGS. 4*a*, 4*b* and 4*c*, several examples 400 of when the input signal to the frame synchronization is over-sampled at more than one sample per symbol will be discussed. The situation of two samples per symbol is considered in three cases. Given the continuous time representation of the frame correlation magnitude 420, FIG. 4*a* illustrates the case where two samples 405 and 410 of the discrete time sampled correlation output cross the threshold which is set at a threshold level or value 415. In this case, the first sample is closer in magnitude to the maximum of the continuous time correlation peak 420 and a detection algorithm must isolate the true frame synchronization peak under these circumstances as sample 405. In FIG. 4*b*, illustrating case 2, two samples 435 and 430 cross the threshold, which has been preset to a threshold level 425. In this case and as can be seen from the figure, the second sample 430 is closer to the maximum of the continuous time correlation peak 420. Referring now to the third case in FIG. 4*c*, only one sample crosses a threshold level 445 at sample 435. The second sample 440 is well below the threshold value. In all three cases, as illustrated further in FIGS. 11*a* and 11*b*, the proposed detection scheme detects the sample closest to the true location of the correlation peak.

Figure 5A:
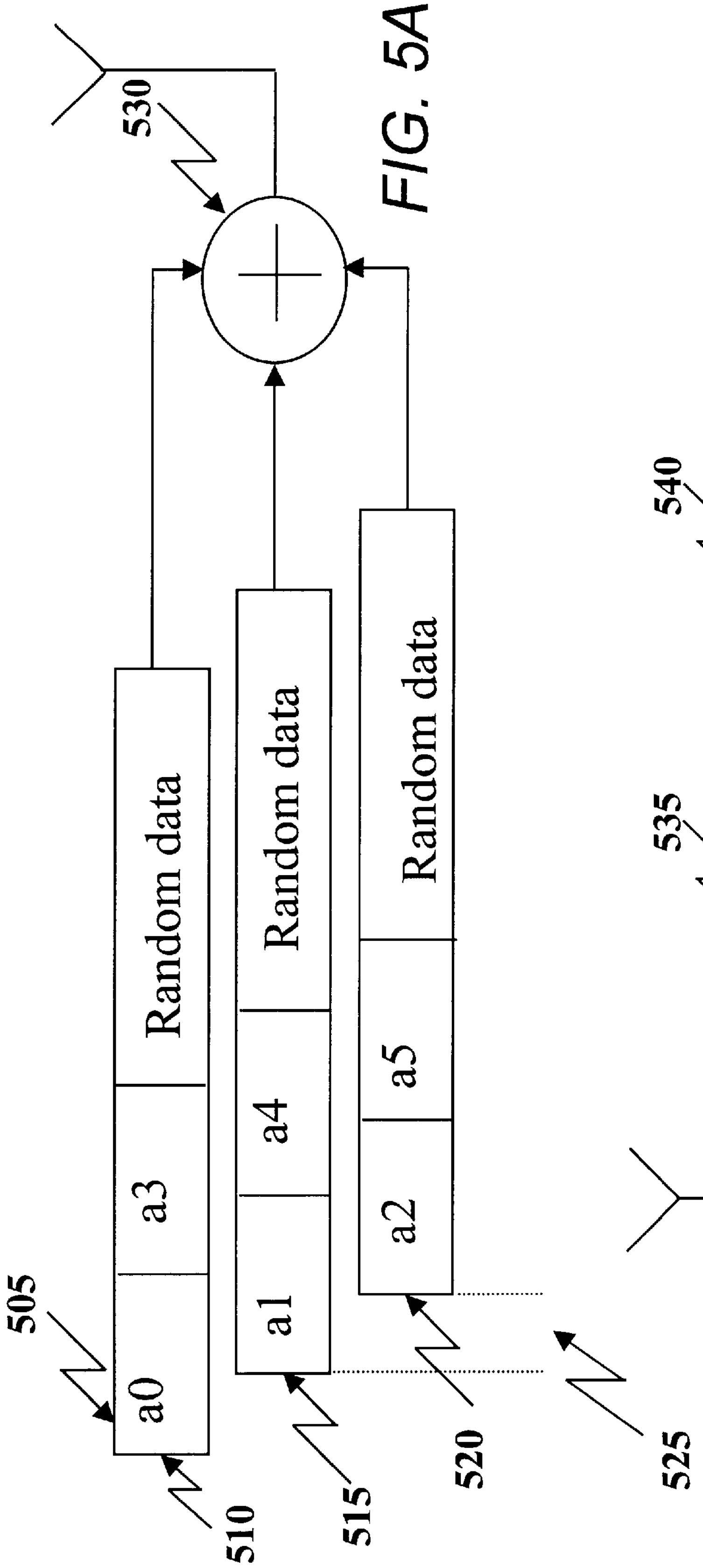
FIG. 5*a* is a diagram showing exemplary frame synchronization for three users at a transmitter.

Referring now to FIG. 5*a*, a proposed concept of the placement of the unique word for one embodiment of a multiple access scheme, a joint TDMA/CDMA scheme (Masood K. Tayebi, "Wireless Multimedia Carrier System", U.S. patent application Ser. No. 08/954,217, filed Oct. 20 1997) will be described. The example illustrates a simplified case of three users and a unique word of six bits in length, which significantly reduces bandwidth losses due to overhead associated with more traditional approaches to frame synchronization. FIG. 5*a* shows the three user data streams 510, 515 and 520, and the unique word bits are distributed as shown in FIG. 5*a* where the first bit 505 is denoted a0. Note that the unique word bits for any one of the data streams are not contiguous, e.g., a0 and a3 for data stream 510. At a transmitter, the first user stream 510 derives its time slot from the timing information transmitted by a base station. The second user stream 515 is subsequently delayed by the duration of one chip of the spreading code with respect to the first user stream 510. The third user stream 520 is subsequently delayed by one chip duration 525 with respect to the second user 515. Note that the three user data streams have been spread in bandwidth using a predefined spreading code. In one embodiment, the length of the spreading code is equal to the number of users. The three user streams are summed together at summer 530 to form the transmitted joint TDMA/CDMA signal. For this example, the sampling rate is one sample per symbol.

Figure 5B:
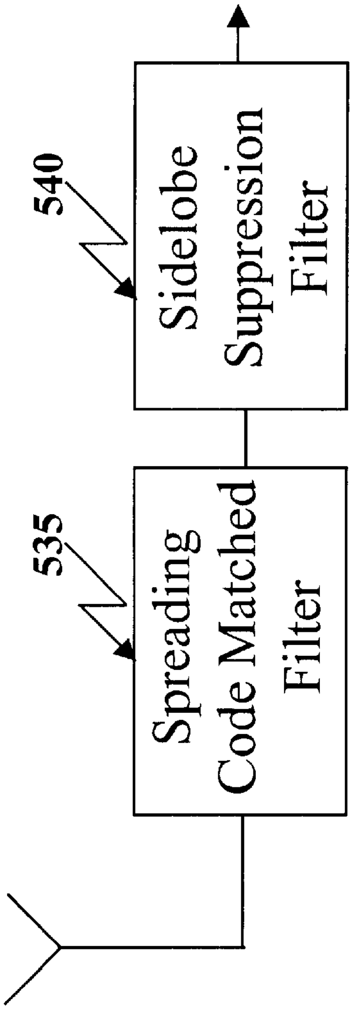
FIG. 5*b* is a diagram of a frame synchronization portion of a receiver.

FIG. 5*b* shows the stages for a signal at a receiver side of the communications system. The first stage in the baseband section of the receiver is to remove the spreading code. This is carried out by feeding the signal into a spreading code matched filter 535. However, after the spreading code matched filter 535, significant sidelobes remain which may give unreliable data samples. Therefore, a sidelobe suppression filter 540 is used. The sidelobe suppression filter 540 significantly reduces Inter-Symbol Interference (ISI). The output of the sidelobe suppression filter 540 contains the unique word in the correct order as shown in FIG. 6b at 630.

Figure 6A:
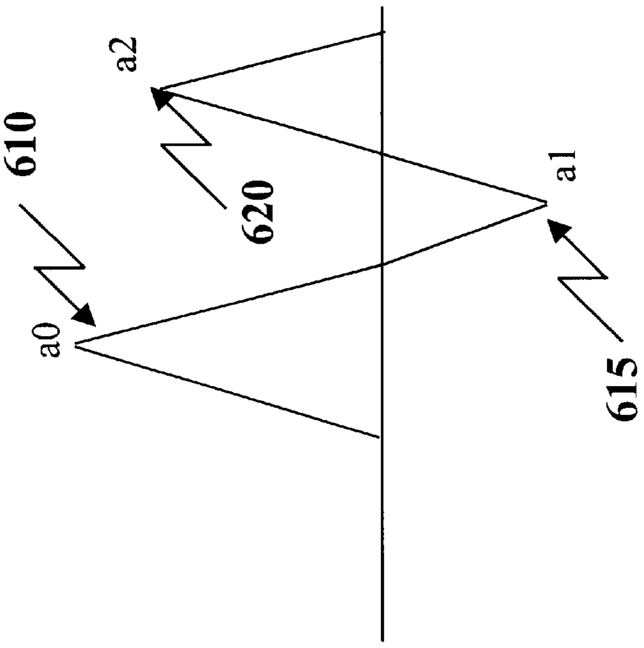
FIG. 6*a* and FIG. 6*b*, is an illustrative example of a unique word used within the transceiver.
Figure 6B:
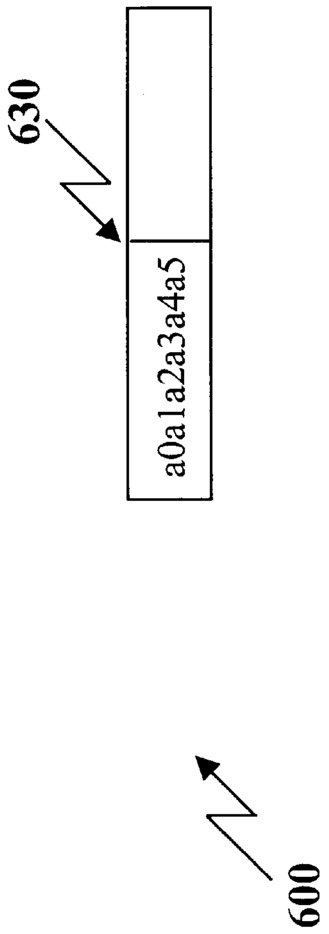

Referring now to FIG. 6*a*, an illustrative example 600 of a unique word used within the transceiver for three users will be described. FIG. 6*a* shows the output of the sidelobe suppression filter 540 (FIG. 5*b*) for the first three samples of the unique word. This output for the three samples is illustrated at 610, 615 and 620. The bits are subdivided into slots equal to the duration of one chip of the spreading code. The unique word duration at the code matched filter 535 (FIG. 5*b*) is equal to the length of the spreading code when the number of chips in the spreading code and the number of bits in the unique word sequence are identical. Otherwise, the unique word duration at the code-matched filter 535 is equal to a multiple of the number of chips in the spreading code. FIG. 6*b*, on the other hand, shows a unique word of length 6 bits. Furthermore, the output of the sidelobe suppression filter 540 (FIG. 5*b*) contains the unique word in the correct format at 630.

Figure 7:
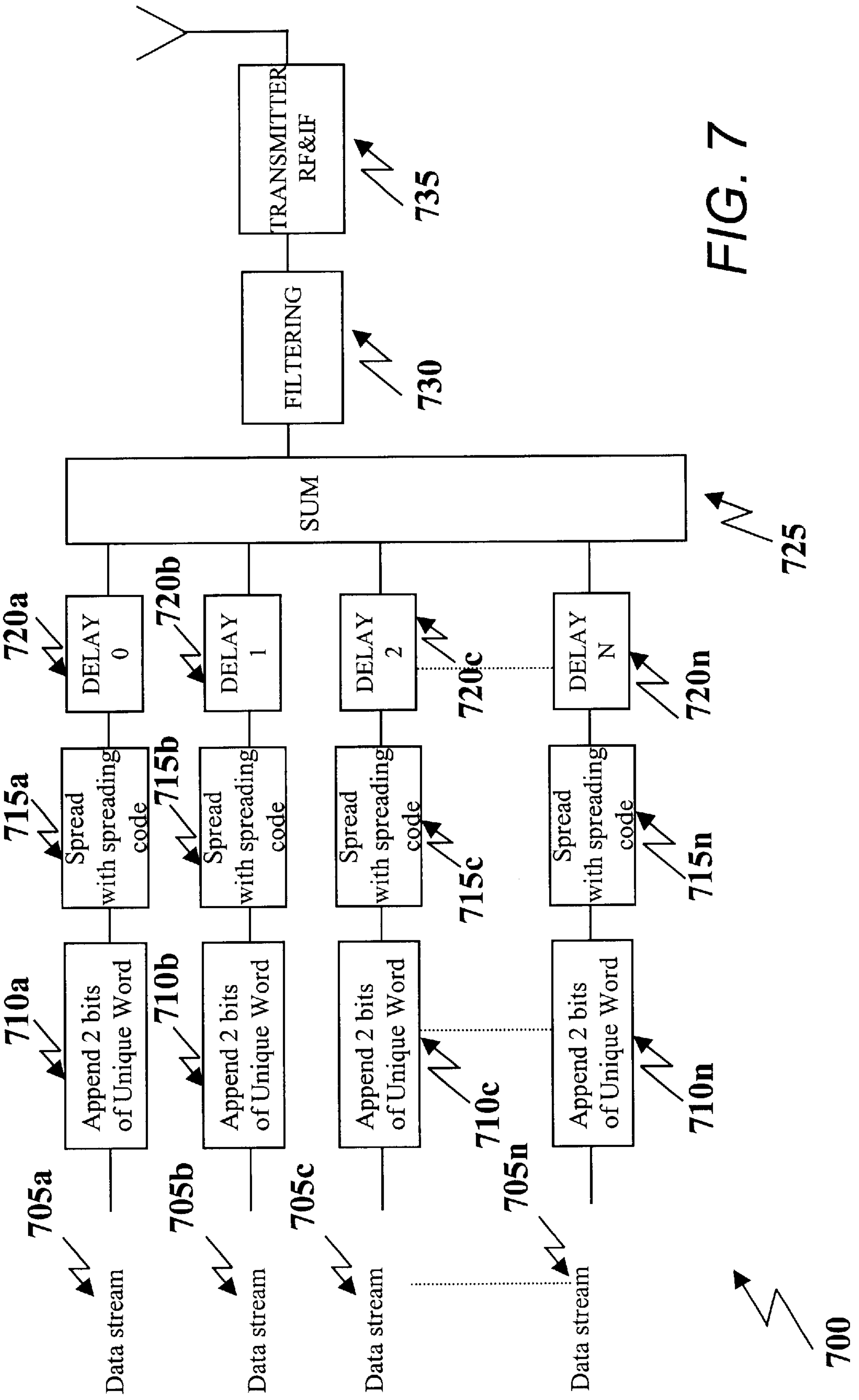
FIG. 7 is a functional block diagram of a digital transmitter using the frame synchronization and detection method and distribution of the unique word bits as implemented in one embodiment of the invention.

Referring to FIG. 7, the key elements of a transmitter 700 of a joint TDMA/CDMA scheme digital transceiver of the present invention will be described. In one embodiment, the transmitter 700 utilizes an arbitrary data burst/packet for each user data stream 705*a* to 705*n*. Two contiguous bits of the unique word for frame synchronization are appended onto the start of the arbitrary data burst for each user data stream at a set of digital append or preamble circuits 710*a* to 710*n*, thereby generating an extended data frame. In another embodiment, another number of contiguous bits may be used, e.g., three contiguous bits. The data bursts of each user data stream are then spread with an identical spreading code at 715*a* to 715*n*. Each data stream is then shifted by a delay equivalent to the length of one chip of the spreading code with respect to the previous user. This shifting is done at delays 720*a* to 720*n*. It is necessary to note that there is no delay for the first user. The shifted user streams are then summed together at summer 725 and fed to a pulse-shaping filter 730 prior to the transmitter intermediate and radio frequency stages 735. In one embodiment, the output of the summer 725 includes an I signal component and a Q signal component. It is necessary to mention that all the above processing is carried out in parallel and digitally. Furthermore, the signal is a multi-level signal, e.g., it may include I and Q branches of a multi-channel signal, e.g., T3/DS3.

Figure 8:
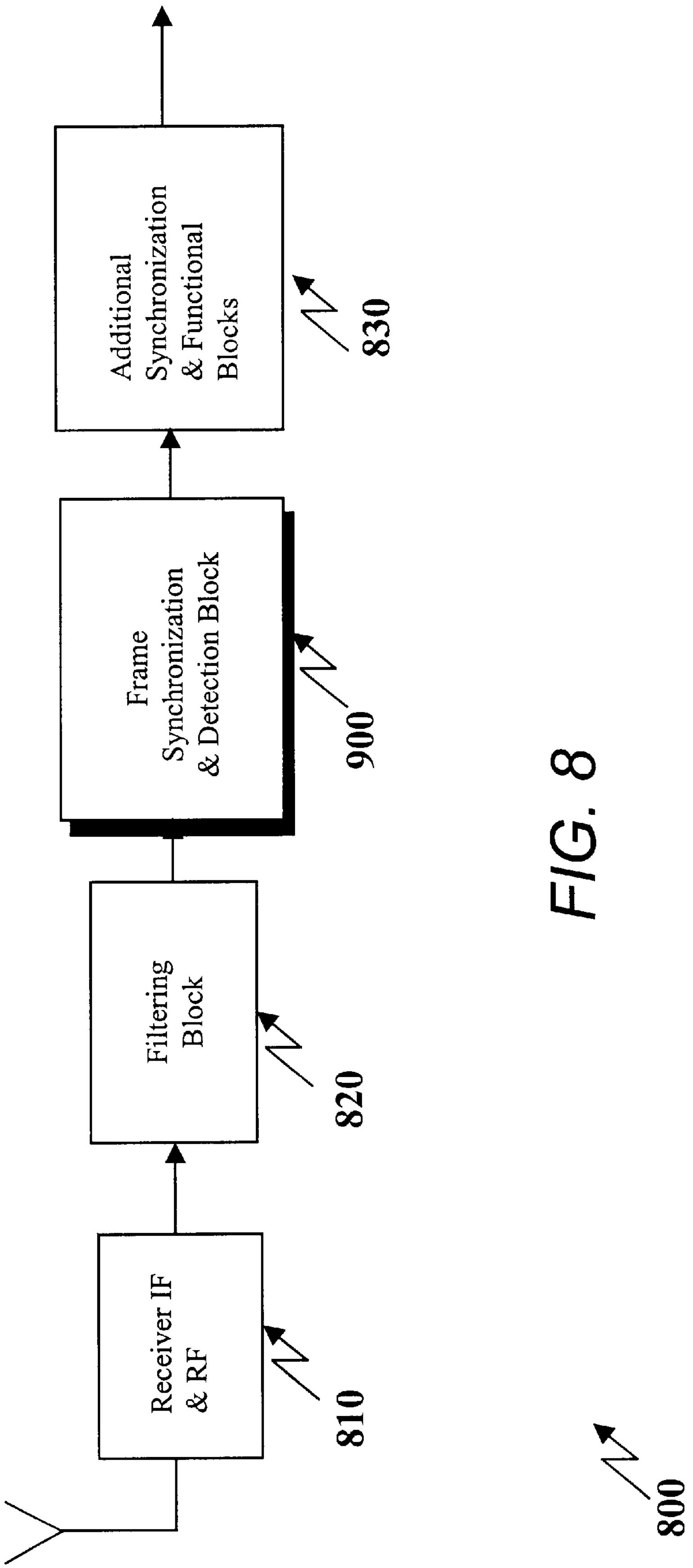
FIG. 8 is a functional block diagram of a digital receiver using the frame synchronization and detection technique as implemented in one embodiment of the invention.

Referring now to FIG. 8, a digital receiver 800 using the proposed frame synchronization and detection technique will be discussed. The digital receiver 800 comprises intermediate and radio frequency modules 810, a filtering block 820, a frame synchronization and detection block 900 and additional synchronization and functional blocks 830. The modulated multi-level signal, which was transmitted over an air-interface by the transmitter 700 (FIG. 7), is received at the modules 810 of the receiver 800 and is separated into an I signal component and an Q signal component. In one embodiment, the filtering block 820 comprises a pulse-shaping filter that is matched to the pulse-shaping filter 730 at the transmitter 700, the spreading code-matched matched filter 535 (FIG. 5*b*) and the sidelobe suppression filter 540 (FIG. 5*b*). The filtering block 820 receives the data stream from the intermediate and radio frequency modules 810. This data stream is sampled at an analog to digital converter (ADC) with a fixed clock within the IF block (not shown here). The sampling rate is equal to two samples per symbol (two samples being the minimum sampling rate to be used). The sampled data stream is then fed into the pulse-shaping filter within the filtering block 820. The pulse-shaping filter provides optimal performance in the presence of Additive White Gaussian Noise (AWGN). Furthermore, the pulse shaping filter is chosen such that the combination of its transfer function and the transfer function of the transmit pulse shaping filter 730 (FIG. 7) is preferably a Nyquist pulse, so as to a yield zero Inter-Symbol Interference (ISI).

In one embodiment, the pulse shaping filtered data stream is fed into the spreading code matched filter 535 and the sidelobe suppression filter 540 for further processing. The spreading code matched filter 535 despreads the incoming data stream in accordance with the spreading code used in the transmit stage. This processing of the data stream by the spreading code matched filter may produce sidelobes and ISI. The output of the spreading code matched filter 535 is therefore fed into the sidelobe a suppression filter 540 to eliminate or minimize the foregoing interference. Furthermore, the output of the sidelobe suppression filter 540 presents the unique word sequence in contiguous order ready for frame synchronization. In other embodiments, it is possible that only a pulse-shaping filter is contained in the filtering block 820. The output from the filtering block 820 is then fed into the frame synchronization block 900 for further processing. The output from the frame synchronization block 900 is fed into additional modules 830 within the digital receiver 800 for further synchronization and data processing.

Referring now to FIG. 9, the frame synchronization and detection unit 900 will be described in detail. In one embodiment, the unit 900 may include a plurality of parallel correlators, magnitude circuits operating on the output of the correlators, summers, and threshold detection circuits to process the parallel user streams received by the unit 900. Additionally, FIG. 9 shows the use of a complex modulation scheme such as quaternary phase shift keying (QPSK), which is known, to an expert in the field. In one embodiment, a portion of the unique word is repeated on both the I-branch 905 and Q-branch 910. The portion of the unique word for a particular user stream matches the appended bits of the unique word for the corresponding user stream at circuit 710 (FIG. 7). For QPSK, a complex matched filter is required. However, as the portion of the unique word is repeated on the I and Q branches 905 and 910, respectively, the complex matched filter can be formed using a simpler method to implement a real filter 915 and 920 on each of the two branches. The equivalent complex matched filter output is formed in a combination circuit 925 by taking the sum of the in-phase and quadrature filter outputs 915 and 920 to form the real branch of the complex filter. The imaginary component of the equivalent complex matched filter is formed as the difference of the real and imaginary filter branches. Thus, in one embodiment, the filters 915 and 920, and the circuit 925 comprise one correlator of the plurality of correlators in the receiver 800. A portion of the unique word used by each of the correlators is stored in a read-only memory (ROM) in one embodiment of the digital receiver 800.

A magnitude of the correlation is taken as implemented in blocks 930 and 935 to maximize the energy of the correlation. Taking the magnitude of such a signal involves first calculating the square of the in-phase component, which takes place in block 935, and the square of the quadrature component at block 930. The outputs of blocks 930 and 935 are then summed at summer 940. This real-valued signal 1005 is then applied to a threshold detection circuit 1000, which includes blocks 945, 950, 955 and 960, and is described in greater detail in connection with FIG. 10.

The threshold detection block 950 is known in the prior technology. Essentially, if the input to the threshold detection block 950 is greater than a certain predefined value, the output of the threshold detection block 950 is a logical high. Otherwise, if the input to 950 is smaller than a certain predefined value, a logic low is transmitted. A comparator block 945 detects the rising edge of the samples at the threshold detector input. The outputs of the threshold detector 950 and the comparator 945 are combined at a logical adder 955. This resulting signal from the logical adder 955 is then fed into a "choose peak" block 960 to choose the maximum of the correlation. When the input signals 905 and 910 are not corrupted by a phase or frequency offset, the threshold detection block 950 is sufficient to ensure reliable synchronization.

Figure 10:
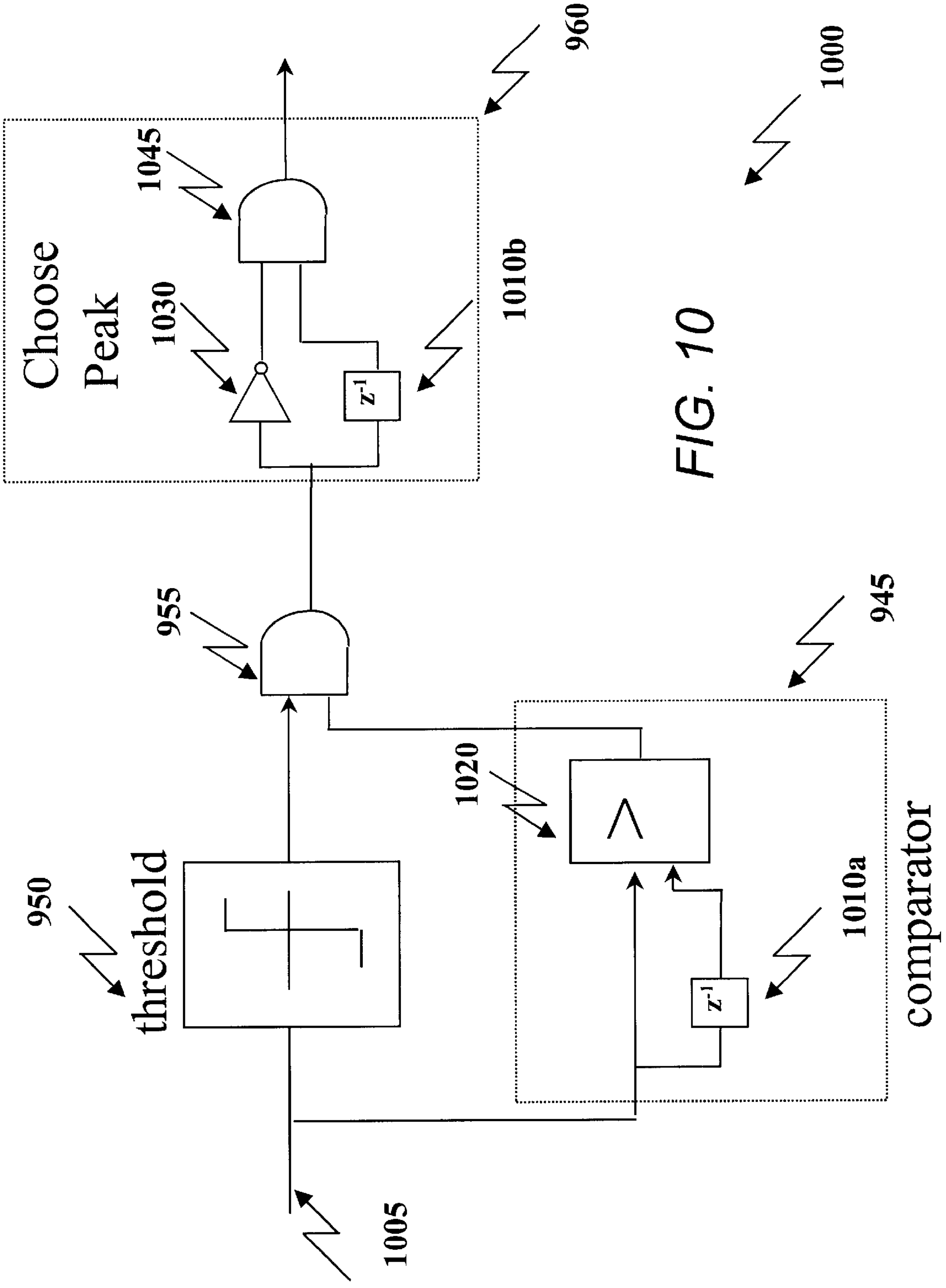
FIG. 10 is a block diagram of the frame detection circuit shown in FIG. 9.

Referring to FIG. 10, one implementation of the threshold detection circuit 1000, shown in FIG. 9, will be described. As mentioned above, the threshold detection circuit 1000 comprises the threshold detection block 950, the comparator block 945, the logical adder 955 and the "choose peak" block 960. The input signal 1005 into the threshold detector 950 is simultaneously fed into the comparator block 945. The comparator block 945 is composed of a unit delay 1010*a* and an 'x greater than y' comparator 1020, which detects those samples of the correlation output with positive slope. The output of the comparator block 945 transmits logic high for those samples of the correlation output with positive slope. The value of the threshold setting in the threshold block 950 is set to a value high enough to cope with the reduction in the correlation peak and sufficient that at least one sample passes the threshold detector 950. This reduction in the correlation peak can be caused by the presence of phase and/or frequency offsets.

The next stage of the threshold detection circuit 1000 is to isolate the output of the comparator block 945 at the instant of the correlation maximum by a logical AND 955 of the threshold block output 950 and the comparator block output 945. The AND operation 955 retains only the rising samples of the threshold block output 950. As there is no guarantee that the AND output is an impulse, i.e., when only one sample passed the threshold, additional logic is necessary to isolate the actual maximum of the threshold output 950. The frame correlation maximum represents the location of the final sample of the unique word. However, in practice, the focus is on the first sample of the arbitrary data. Therefore, the objective is to produce a peak corresponding to the location of the frame synchronization maximum one sample immediately after the frame synchronization actually occurs. This is implemented in the "choose peak" block 960, which involves forming the logical AND 1045 of the output of inverter 1030 and a unit delay 1010*b*. Three different examples illustrating the operation of this circuit are shown in FIGS. 11*a* and 11*b*.

Figure 11A:
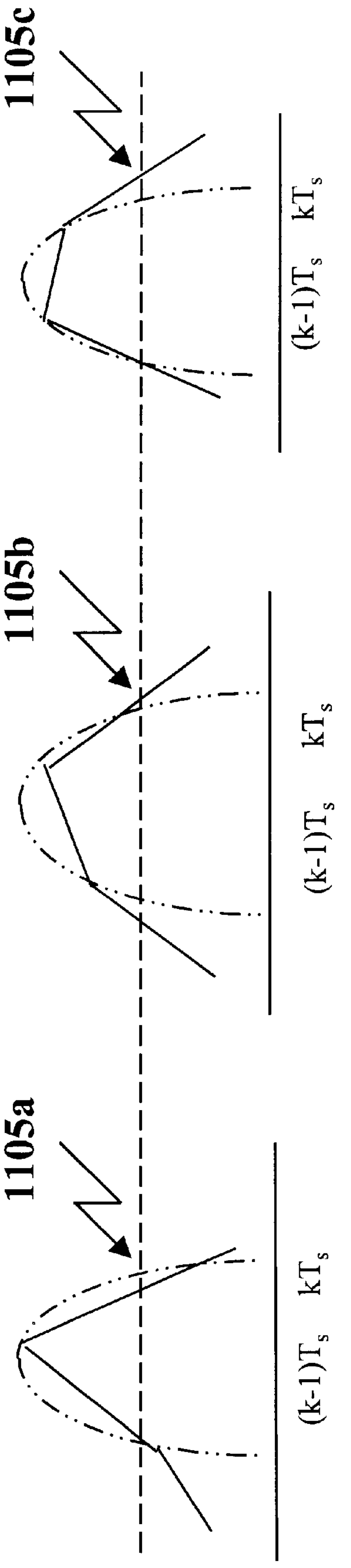
FIGS. 11*a* and 11*b* are diagrams showing operation of the frame detection circuit of FIG. 10 for three different sampling situations.
Figure 11B:
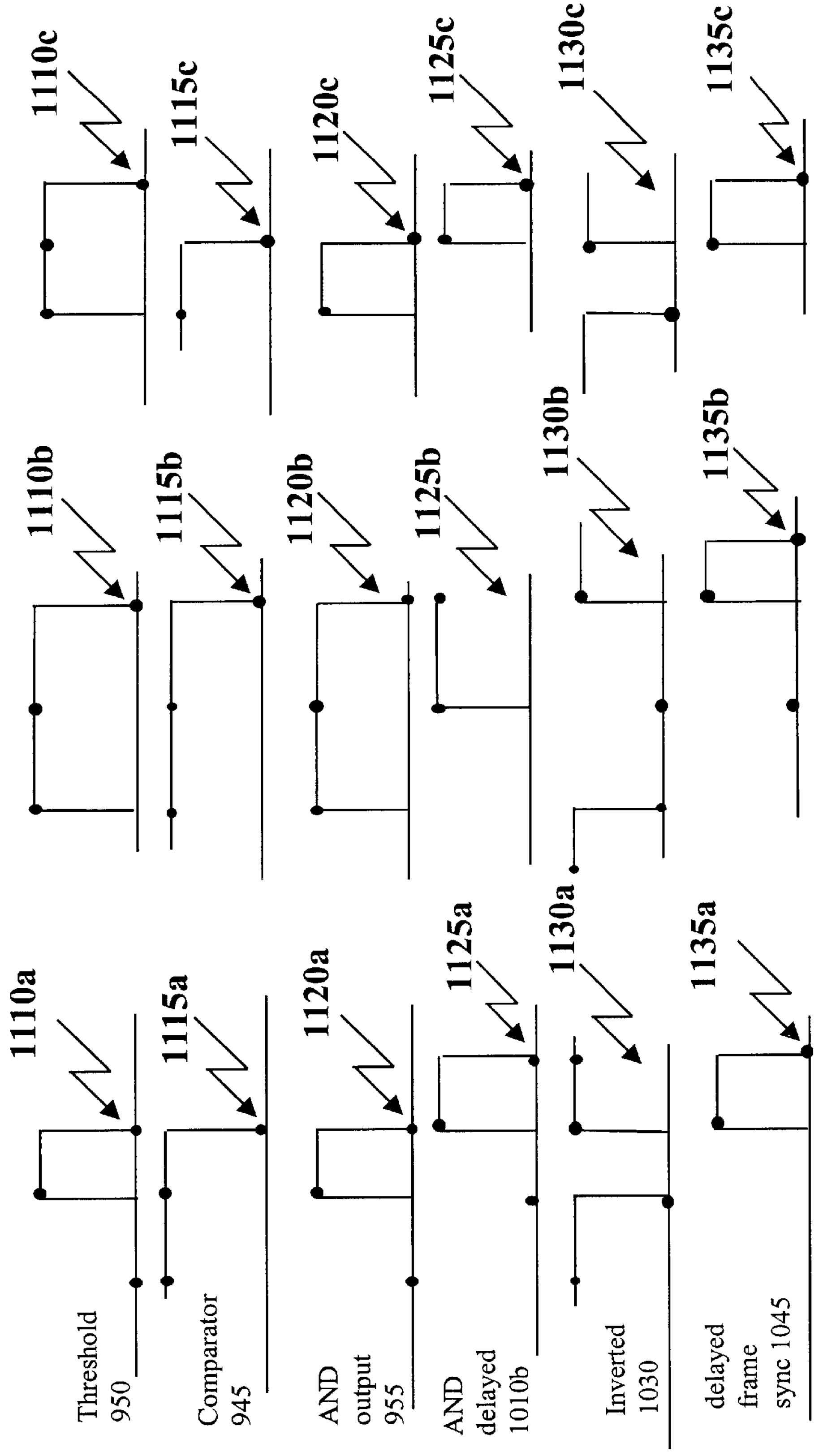

Referring now to FIGS. 11*a* and 11*b*, examples are discussed of how the threshold detection circuit 1000, described in FIG. 10, gives the location of the true maximum of the frame correlation output for three different threshold detection situations. Waveform 1105*a* illustrates when one sample crosses (exceeds) the threshold detector 950. Waveform 1105*b* illustrates the situation when two samples cross the threshold detector 950 and the second sample corresponds to the frame peak. Waveform 1105*c* illustrates the case where two samples again cross the threshold detector 950 and the frame peak is the first value to cross the threshold. For each of the three waveforms 1105*a*, 1105*b* and 1105*c* shown in FIG. 11*a*, the continuous frame correlation curve is also illustrated.

Referring jointly to FIG. 9, FIG. 10 and FIG. 11*b*, for waveforms 1105*a*, 1105*b* and 1105*c*, the output of the threshold detector 950 is a logic high for those samples which exceed the threshold value at block 950 at 1110*a*, 1110*b* and 1110*c*. Otherwise, the output of the threshold block 950 is logic low. The waveforms 1105*a*, 1105*b* and 1105*c*, shown in FIG. 11*a*, are simultaneously fed into a set of parallel comparator circuits such as comparator circuit 945. The output of the comparator circuit 945 is a logic high for those samples with a positive slope. For waveform 1105*a*, the first two samples are on the positive edge of the correlation slope, i.e., their values are increasing which gives a logic high for these two values at signal 1115*a*, as is also true for waveform 1105*b*. Only for waveform 1105*c* is the output of the comparator block 945 a logic high for one sample at signal 1115*c*. Combining these two observations at the circuit 955 by performing a logical AND gives signals 1120*a*, 1120*b* and 1120*c*. Using a simple manipulation of the logical AND 955 output signals 1120*a*, 1120*b* and 1120*c* to give the location of a delayed frame synchronization peak at the instant corresponding to one sample following the frame synchronization peak gives the outputs at signals 1135*a*, 1135*b* and 1135*c*. Delaying the AND output at the delay 1010*b*, forming the logical NOT of AND 955 at the inverter 1030 and forming the logical AND of these two signals at the AND circuit 1045 gives the desired delayed frame synchronization pulse. FIG. 11 does not illustrate the case where two samples of equal magnitude pass the threshold. In one embodiment, the frame synchronization circuit selects the first sample. Obviously, the true maximum is somewhere between these two samples; however, this information is not available from the samples.

While the above detailed description has shown, described, and pointed out the fundamental novel features of the invention as applied to various embodiments, it will be understood that various omissions and substitutions and changes in the form and details of the system illustrated may be made by those skilled in the art, without departing from the spirit of the invention.

What is claimed is:

1. For use in a digital transmitter, a combiner circuit having a unique word and receiving a predetermined number of data streams, wherein each data stream comprises a plurality of data frames, the combiner circuit comprising:

a plurality of digital preamble circuits, each preamble circuit associated with one of the data streams and being capable of appending a predetermined portion of contiguous bits from the unique word to the beginning of each data frame to generate an extended data frame;

a plurality of spreader, wherein the extended data frame for a particular data stream utilizes the same predetermined unique word portion; each spreader associated with one of the data streams and being capable of spreading each extended data frame, wherein each spreader receives a spreading code comprising a plurality of chips;

a plurality of shifters, each shifter associated with one of the data streams and being capable of shifting the spread extended data frame by a delay equivalent to a multiple of the length of one chip of the spreading code; and a summer receivably connected to the shifters and being capable of summing the plurality of shifted data streams.

2. The combiner circuit defined in claim 1, wherein the digital transmitter utilizes a joint time division multiple access (TDMA)/code division multiple access (CDMA) signal protocol.

3. The combiner circuit defined in claim 1, wherein the spreader uses an identical spreading code for each data stream.

4. The combiner circuit defined in claim 1, wherein the shifter for one of the data streams does not utilize a delay.

5. The combiner circuit defined in claim 1, additionally comprising a pulse-shaping filter receiving the signal output of the summer.

6. The combiner circuit defined in claim 1, wherein the predetermined number of contiguous bits from the unique word appended to the beginning of any one data frame identifies the start of the one data frame.

7. The combiner circuit defined in claim 1, wherein the length of the unique word is equal to the number of data streams times the predetermined number of contiguous bits.

8. The combiner circuit defined in claim 1, wherein the output of the summer includes an in-phase component and a quadrature component.

9. A method of combining data in a digital transmitter, wherein the data comprises a unique word and a predetermined number of data streams, and wherein each data stream comprises a plurality of data frames, the method comprising:

appending a predetermined wherein the extended data frame for a particular data stream utilizes the same predetermined unique word portion, of contiguous bits from the unique word to beginning of each data frame so as to generate an extended data frame;

spreading each extended data frame in each one of the data streams with a spreading code comprising a plurality of chips;

shifting the spread extended data frame by a delay equivalent to a multiple of the length of one chip of the spreading code; and summing the plurality of shifted data streams.

10. The method of claim 9, wherein the digital transmitter utilizes a joint time division multiple access (TDMA)/code division multiple access (CDMA) signal protocol.

11. The method of claim 9, wherein the appending is performed by a plurality of preamble circuits, each preamble circuit being associated with one of the data streams.

12. The method of claim 9, wherein the spreading is performed by a plurality of spreaders, each spreader being associated with one of the data streams.

13. The method of claim 9, wherein the shifting is performed by a plurality of shifters, each shifter being associated with one of the data streams.

14. The method of claim 9, wherein the summing is performed by a summer.

15. The method of claim 9, wherein the spreading of each extended data frame includes applying an identical spreading code for each data stream.

16. The method of claim 9, wherein the shifting for one of the data streams does not include a delay.

17. The method of claim 9, further comprising pulse shape filtering the output of the summing.

18. The method of claim 9, wherein the predetermined number of contiguous bits from the unique word appended to the beginning of any one data frame identifies the start of the one data frame.

19. The method of claim 9, wherein the length of the unique word is equal to the number of data streams times the predetermined number of contiguous bits.

20. The method of claim 9, wherein the appending, spreading, and shifting of the data streams are performed in parallel.

* * * * *

UNITED STATES PATENT AND TRADEMARK OFFICE

CERTIFICATE OF CORRECTION

PATENT NO. : 6,563,856 B1
DATED : May 13, 2003
INVENTOR(S) : O'Shea et al.

It is certified that error appears in the above-identified patent and that said Letters Patent is hereby corrected as shown below:

Title page, Item [54] and Column 1, lines 1-3,
Title should read:
-- COMBINER CIRCUIT AND METHOD FOR A DIGITAL TRANSMITTER --

Signed and Sealed this

Thirteenth Day of April, 2004

JON W. DUDAS
*Acting Director of the United States Patent and Trademark Office*